(12) United States Patent
Goenueldinc

(10) Patent No.: US 8,113,571 B2
(45) Date of Patent: Feb. 14, 2012

(54) PASSENGER MOTOR VEHICLE WITH REAR-SIDE AIR GUIDING DEVICE

(75) Inventor: Okan Goenueldinc, Ostifildern (DE)

(73) Assignee: Dr. Ing. h.c.F. Porsche Aktiengesellschaft (DE)

( * ) Notice: Subject to any disclaimer, the term of this patent is extended or adjusted under 35 U.S.C. 154(b) by 0 days.

(21) Appl. No.: 13/007,164

(22) Filed: Jan. 14, 2011

(65) Prior Publication Data

US 2011/0169299 A1 Jul. 14, 2011

(30) Foreign Application Priority Data

Jan. 14, 2010 (DE) .......................... 10 2010 004 561

(51) Int. Cl.
*B62D 35/00* (2006.01)
(52) U.S. Cl. ................................. 296/180.5; 296/180.1
(58) Field of Classification Search ............... 296/180.1, 296/180.2, 180.3, 180.4, 180.5
See application file for complete search history.

(56) References Cited

U.S. PATENT DOCUMENTS

| | | | | |
|---|---|---|---|---|
| 4,558,898 A | * | 12/1985 | Deaver ........................ | 296/180.1 |
| 4,671,555 A | * | 6/1987 | Linz et al. .................. | 296/180.5 |
| 5,013,081 A | * | 5/1991 | Cronce et al. .............. | 296/180.1 |
| 6,139,090 A | * | 10/2000 | Stidd .......................... | 296/180.5 |
| 6,520,564 B1 | * | 2/2003 | Liang ......................... | 296/180.5 |
| 7,264,300 B2 | | 9/2007 | Hillgaertner | |
| 2002/0021022 A1 | * | 2/2002 | Erdelitsch et al. ......... | 296/180.1 |
| 2002/0125738 A1 | * | 9/2002 | Pettey ........................ | 296/180.5 |
| 2004/0256885 A1 | * | 12/2004 | Bui ............................ | 296/180.5 |
| 2005/0029835 A1 | * | 2/2005 | Adams ....................... | 296/180.1 |
| 2007/0145776 A1 | * | 6/2007 | Grave et al. ............... | 296/180.5 |

FOREIGN PATENT DOCUMENTS

DE 197 41 321 12/1998
DE 10 2004 033 175 2/2006

* cited by examiner

*Primary Examiner* — Lori Lyjak
(74) *Attorney, Agent, or Firm* — Gerald E. Hespos; Michael J. Porco

(57) ABSTRACT

A passenger motor vehicle has an air guiding device (8) mounted at a rear end of the vehicle and moveable relative to the rear end by a setting-out mechanism (7). A mounting element (11) connects the setting-out mechanism (7) at a downwardly open depression (12) at an underside region of the air guiding device (8). The mounting element (11) is hooked into the air guiding device (8) in a first region (13), and is connected to the air guiding device (8) by a screw connection (21) in a second region (15). The design enables particularly simple, cheap and fast mounting of the setting-out mechanism in the air guiding device (8).

17 Claims, 3 Drawing Sheets

PASSENGER MOTOR VEHICLE WITH REAR-SIDE AIR GUIDING DEVICE

CROSS-REFERENCE TO RELATED APPLICATION

This application claims priority under 35 USC 119 to German Patent Application No. 10 2010 004 561.6, filed on Jan. 14, 2010, the entire disclosure of which is incorporated herein by reference.

BACKGROUND OF THE INVENTION

1. Field of the Invention

The invention relates to a passenger motor vehicle having an air guiding device that is designed as a wing or spoiler blade mounted to the rear end of the vehicle. The air guiding device can be moved relative to the rear end by means of a setting-out mechanism that is connected to the underside of the air guiding device by a mounting element with a screw connection. The mounting element is mounted in a downwardly open depression of the air guiding device.

2. Description of the Related Art

The above-described wing or spoiler blade can be deployed from a retracted position when the passenger motor vehicle reaches a relatively high speed. The movable wing or the spoiler may also be pivotable. Such an exposed joint however is a problem with regard to design and aerodynamics. The wing or spoiler blade may be mounted directly to the setting-out mechanism without a pivot joint. However, design and aerodynamic problems exist with respect to flow around the setting out mechanism when the wing or spoiler blade is in the deployed position.

The joint or the connecting region of the setting-out mechanism and air guiding device are partially visible when the air guiding device is deployed. It is basically undesirable for components which that connect the setting-out mechanism and air guiding device to be visible because these components do not meet either stylistic or aerodynamic requirements. The design of these components is substantially predefined based on their technical function, and hence it is virtually impossible to make significant modifications for design and for aerodynamics. Large amounts of effort have been expended to obtain small optimizations, such as a special, inconspicuous coloring of the setting-out mechanism or of the joint, or else the encasement of the components by in a bellows.

DE 197 41 321 A1 discloses a passenger motor vehicle with an air guiding device that has a fastening part. The fastening part has a tubular section and an adjoining plate-shaped section that is connected to the setting-out mechanism. The tubular section is screwed to the setting-out mechanism and further screws connect the plate-shaped section to a threaded plate embedded into the rear wing of the passenger motor vehicle. The connection of the setting-out mechanism and air-guiding device therefore is formed exclusively as a screw connection. The rear screw connection is visible when the wing or spoiler blade is deployed, and therefore has an adverse effect on the design. Additionally, the wing or the spoiler holds the threaded plate in an embedded manner. An increased expenditure is required to mount the air guiding device due to the screw connection of the plate-shaped section of the setting-out mechanism and the tubular section of the setting-out mechanism, and due to the screw connection of the plate-shaped section of the setting-out mechanism to the threaded plate of the wing or spoiler. Furthermore, the design is expensive due to the production of the individual parts situated in the region of the air guiding device.

It is an object of the invention to provide a passenger motor vehicle with a particularly simple, cheap and fast mounting of the setting-out mechanism in the air guiding device.

SUMMARY OF THE INVENTION

The object is achieved by providing a mounting element with a first region that is hooked into the air guiding device and a second region that is screwed into connection with the air guiding device.

The inventive plug-in/screw connection of the mounting element and air guiding device permits a particularly simple and fast mounting of the air guiding device. It merely is necessary for the air guiding device to be plugged into the mounting element that already is connected to the setting-out mechanism, and for the air guiding device to be screwed to the mounting element in a region facing away from the plugged-in region. This results in a considerable reduction in the number of screws used in relation to known connections of the air guiding device and mounting element. The attachment of the air-guiding device to the setting-out mechanism preferably is realized by a single screw. Thus, the air guiding device can be connected to the setting-out mechanism within an extremely short time, and the arrangement offers visual and aerodynamic advantages as a result of the low number of screws or fastening elements.

The first region of the mounting element preferably is arranged at the rear relative to the travel direction of the vehicle and the second region of the mounting element is arranged at the front. Accordingly, the second region is hooked into the mounting element at the rear, and the screw connection between the mounting element and air guiding device is at the front. Thus, the plug-in connection at the rear is not visible from the rear when the air guiding device is deployed. Additionally, the front screw connection is hidden by the setting-out mechanism, and also is not visible.

The air guiding device preferably has a receptacle for plugging in a projection of the mounting element. The receptacle or the projection preferably is aligned substantially in the longitudinal direction of the passenger motor vehicle. The plugging-in of the air guiding device therefore takes place by a rearwardly directed movement. Hence, the receptacle for plugging in the projection hides the mounting element.

The mounting element preferably is formed in one piece and therefore is structurally simple. For example, a mounting element formed as a sheet metal part can be produced in a particularly simple manner and has adequate strength for holding the air guiding device. The mounting element can be produced in a particularly simple manner by pressing a sheet-metal part.

To achieve visual, aerodynamic and stability objectives, the mounting element should be hidden, should be arranged outside the region around which flow passes, and should have length, width and depth dimensions to achieve the necessary stability for holding the air guiding device and absorbing the applied forces. Accordingly, the downwardly open depression of the air guiding device preferably extends substantially as far as the upper wall of the air guiding device and the mounting element preferably extends through the depression. A relatively large cavity preferably is defined within the air guiding device and receives the mounting element. Thus, mounting element preferably has a relatively large extent in the depth direction and does not project a significant extent out of the depression or beyond the lower contour of the air guiding device.

Remote ends of the mounting element preferably have plate regions to achieve an optimum 3-dimensional design.

One plate is hooked into the air guiding device and the other plate bears against a slightly recessed region of the air guiding device. An area between the plate regions of the mounting element extends through the downwardly open depression and functions to receive the setting-out mechanism. The area of the mounting element that receives the setting-out mechanism has a large structural depth and is optimally suitable for transmitting the forces from the air guiding device into the setting-out mechanism.

The setting-out mechanism preferably is mounted in the mounting element by a joint. The joint is arranged within the depression of the air guiding device. Thus, the air guiding device can be inclined in different positions.

The passenger motor vehicle preferably has the air guiding device mounted by two setting-out mechanisms arranged at a distance from one another in the transverse direction of the passenger motor vehicle. The setting-out mechanisms preferably are arranged in the end regions of the air guiding device. Each setting-out mechanism is mounted in the air guiding device by one of the above-described mounting elements which assigned to a respective setting-out mechanism.

The fact that the mounting element is received by the cavity in the air guiding device results in a reduction of the required installation space and a pleasing appearance. Furthermore, both aerodynamics and aeroacoustics are improved since flow does not pass around or through the mounting arrangement.

Further features of the invention will emerge from the appended drawings and from the description of the preferred embodiment depicted in the drawings, without the invention being restricted thereto.

BRIEF DESCRIPTION OF THE PREFERRED EMBODIMENT

Figure 1:
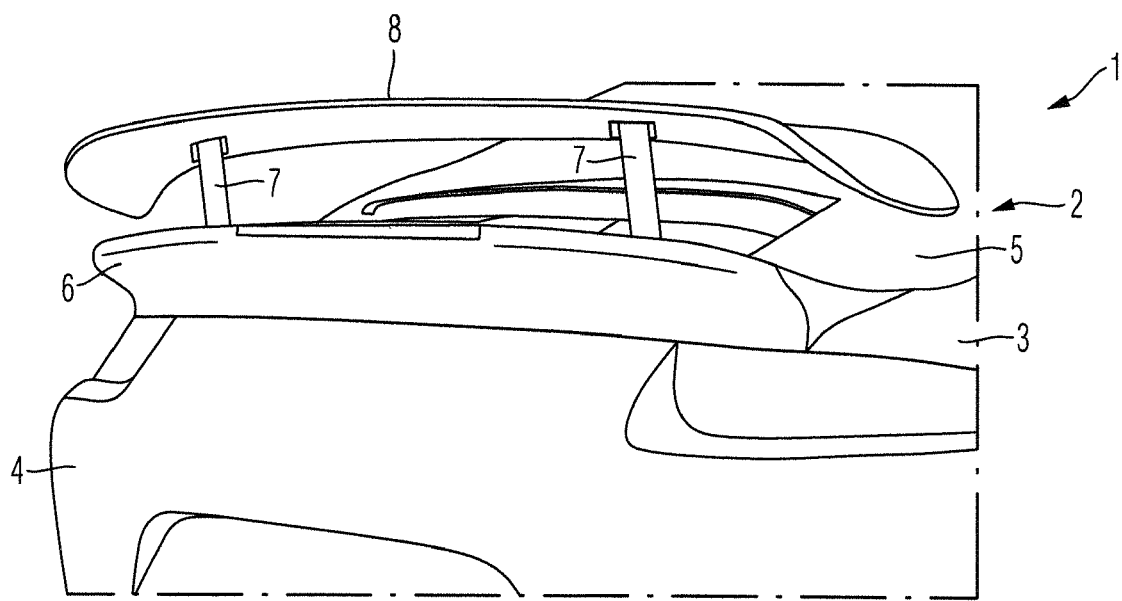
FIG. 1 is a rear view of a passenger motor vehicle according to the invention in the region of the vehicle rear end, with the air guiding device deployed.

FIG. 1 shows a passenger motor vehicle 1 in a region of its rear end 2. The passenger motor vehicle 1 has a body 3 with a rear bumper 4 and a tailgate 5. A rear spoiler 6 is between the rear bumper and the tailgate 5 and extends in the transverse direction of the vehicle 1. Two setting-out mechanisms 7 extend through said rear spoiler 6 and can be raised and lowered by actuating means (not illustrated) mounted in the rear end 2 for deploying and retracting the air guiding device, which is a wing 8. The retracted wing 8 rests on the rear spoiler 6. However, the wing 8 is deployed into the raised position shown in FIG. 1 when the passenger motor vehicle 1 reaches a relatively high speed. The actuating means for moving the two setting-out mechanisms 7 are not shown.

Figure 2:
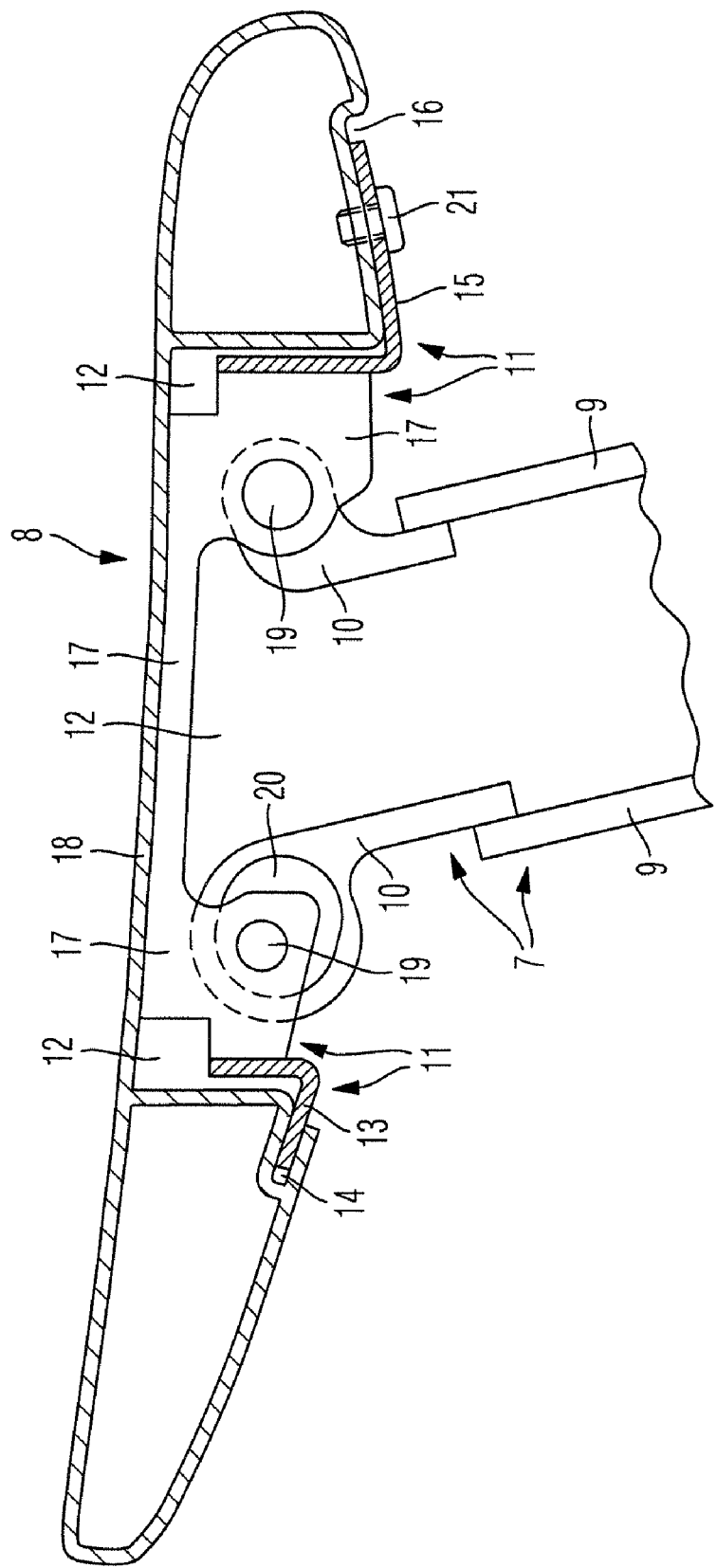
FIG. 2 is a section through the air guiding device in the region of a setting-out mechanism, and the setting-out mechanism end connected to the air guiding device.
Figure 3:
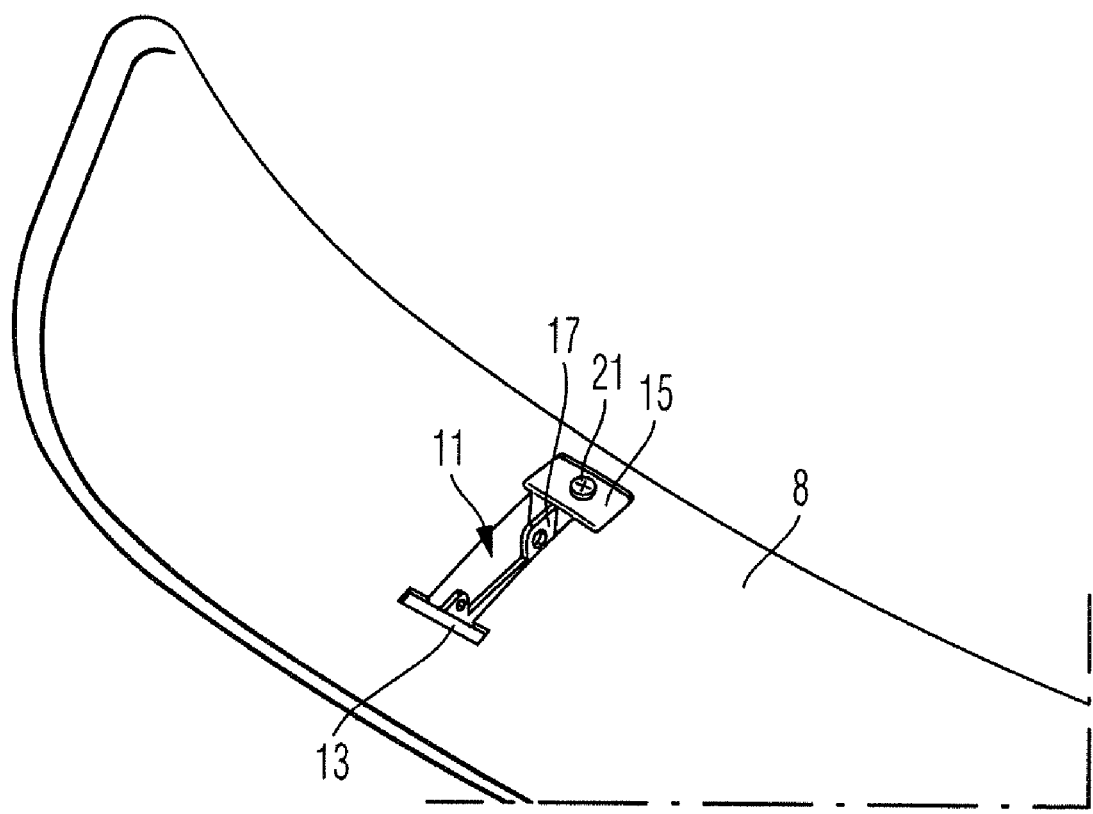
FIG. 3 is a view of the air guiding device from below in the region of one half to illustrate the mounting of the mounting element assigned to the respective setting-out mechanism in the air guiding device.

FIG. 2 shows the wing 8 mounted to upper end of one of the setting-out mechanisms 7, with the mounting to the other setting-out mechanism 7 being substantially identical. The setting-out mechanism 7 includes a setting-out mechanism tube 9 that is circular in cross section and can be raised and lowered by the associated actuating means. The setting-out mechanism 7 also includes a joint 10 that is connected to the setting-out mechanism tube 9 and is mounted in a mounting element 11, which in turn is mounted in the wing 8.

The wing 8 has a downwardly open depression 12 through which the mounting element 11 extends. The rear end of the mounting element 11 is hooked into the wing 8 and the front end of the mounting element 11 is connected to the wing 8 by a screw connection. The mounting element 11 has plates at the remote ends. The rear plate 13 forms a projection of the mounting element and is plugged into a receptacle 14 of the wing 8. The receptacle 14 and the rear plate 13 are aligned substantially in the longitudinal direction of the passenger motor vehicle 1. The front plate 15 of the mounting element bears against a slightly recessed region 16 of the wing 8. A mounting web 17 is arranged between and connects the two plates 13 and 15. The mounting web 17 of the mounting element 11 extends through the depression 12 for fastening the joint 10. The mounting web 17 extends over the entire depth of the depression 12 as far as the upper wall 18 of the wing 8, against which the mounting web 17 is supported from below.

The mounting element 11 is formed in one piece and is formed as a sheet-metal part.

Each of the front and rear ends of the mounting web 17 has a receiving hole that receives a connecting pin 19 for connecting the joint 10 to the mounting element 11. The joint 10 is mounted at the front so as to be pivotable about the stationary axis formed by the associated connecting pin 19, and is articulatedly mounted at the rear in the rear connecting pin 19. Therefore, the attack angle of the wing 8 can be varied by pivoting an adjustable eccentric 20.

The described design enables the wing 8 to be mounted in a particularly simple manner. Specifically the mounting elements 11 are connected to the joints 10 of the respective setting-out mechanisms 7. The wing 8 then is plugged onto the joints 10 in that the rear plates 13 thereof are plugged into the receiving chambers 14 and the wing 8 then is moved down at the front, so that the wing 8 makes contact at the front with the front plate 15, which is associated with the respective mounting element 11, in the region of the depression 16. It then merely is necessary for a screw 21 to be inserted through a bore in the front plate 15 and to be screwed into a threaded bore (not shown) of the wing 8.

What is claimed is:

1. A passenger motor vehicle having an air guiding device mounted in a rear end of the vehicle and being moveable relative to the rear end by at least one setting-out mechanism, the air guiding device having an underside region formed with at least one downwardly open depression, a mounting element mounted in the downwardly open depression of the air guiding device and connecting the setting-out mechanism to the underside region of the air guiding device, the mounting element having a first region that is hooked into the air guiding device and a second region connected to the air guiding device by a screw connection.

2. The vehicle of claim 1, wherein the air guiding device is a wing or spoiler blade.

3. The vehicle of claim 2, wherein the air guiding device has a receptacle for plugging in a projection of the mounting element.

4. The vehicle of claim 3, wherein the receptacle or the projection is aligned substantially in a longitudinal direction of the vehicle.

5. The vehicle of claim 1, wherein the first region of the mounting element is rearward of the second region of the mounting element.

6. The vehicle of claim 1, wherein the mounting element is formed in one piece.

7. The vehicle of claim 6, wherein the mounting element is a sheet-metal part.

8. The vehicle of claim 1, wherein the downwardly open depression of the air guiding device extends substantially as far as an upper wall of the air guiding device, and the mounting element extends through the depression.

9. The vehicle of claim 7, wherein the mounting element has first and second spaced apart plates, the first plate being hooked into the air guiding device and the second plate being screwed to a recessed region of the air guiding device, a region of the mounting element between the first and second plates extending through the downwardly open depression of the air guiding device and receiving the setting-out mechanism.

10. The vehicle of claim 1, wherein the setting-out mechanism is mounted in the mounting element by a joint arranged within the depression of the air guiding device.

11. The vehicle of claim 1, wherein the mounting element is connected to the air guiding device by a single screw.

12. The vehicle of claim 1, wherein the at least one setting-out mechanism comprises two setting-out mechanisms spaced transversely from one another at transverse end regions of the air guiding device.

13. A passenger motor vehicle having a rear end and opposite left and right sides, an air guiding device mounted in proximity to the rear end of the vehicle and having opposite left and right ends in proximity to the left and right sides of the vehicle, the air guiding device being moveable relative to the rear end by left and right setting-out mechanisms, the air guiding device having an underside region formed with downwardly open depressions, mounting element mounted respectively in the downwardly open depressions of the air guiding device and connecting the setting-out mechanisms to the underside region of the air guiding device, each of the mounting elements having a first region that is hooked into the air guiding device and a second region connected to the air guiding device by a screw connection.

14. The vehicle of claim 13, wherein the air guiding device is a wing or spoiler blade.

15. The vehicle of claim 14, wherein the first region of each mounting element is rearward of the second region of each mounting element.

16. The vehicle of claim 13, wherein the downwardly open depressions of the air guiding device extend substantially to an upper wall of the air guiding device, and the mounting elements extend through the depressions.

17. The vehicle of claim 16, wherein each of the mounting elements (11) has first and second spaced apart plates (13, 15), the first plate (13) being hooked into the air guiding device (8) and the second plate (15) being screwed to a recessed region (16) of the air guiding device (8), a region (17) of each of the mounting elements (11) between the respective first and second plates (13, 15) extending through the downwardly open depression (12) of the air guiding device (8) and receiving the respective setting-out mechanism (7).

\* \* \* \* \*